G. W. Cady,
Knob.
No. 104,420.   Patented June 21, 1870.
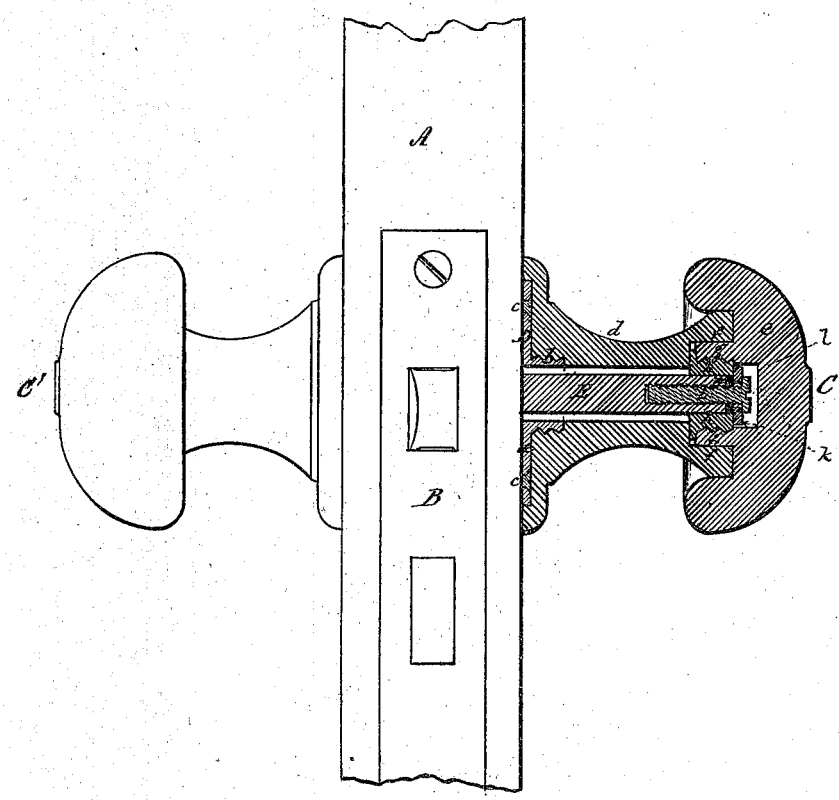
Witnesses..
S. N. Piper
J. R. Snow
George W. Cady  Inventor.
by his attorney
R. N. Cady

United States Patent Office.

GEORGE W. CADY, OF PROVIDENCE, RHODE ISLAND.

Letters Patent No. 104,420, dated June 21, 1870.

IMPROVEMENT IN DOOR-KNOBS.

The Schedule referred to in these Letters Patent and making part of the same.

*To all persons to whom these presents may come:*

Be it known that I, GEORGE W. CADY, of the city and county of Providence, of the State of Rhode Island, have made a new and useful invention, having reference to Door-Knobs; and do hereby declare the same to be fully described in the following specification, and represented in the accompanying drawing, which denotes a door with a lock and pair of knobs applied to it, one of the latter being exhibited in longitudinal section, in order to illustrate my invention.

In such drawing—

A denotes the door, or a part thereof;
B, the lock;
C, one knob; and
C', the other knob.

One object of the improved knob hereinafter described is to avoid, for the purpose of connecting a knob to its shank, the employment of a pin or screw, going transversely into or through the knob and shank, the pin or screw, under such circumstances, being very liable to work loose and fall out of place, so as to admit of the separation of the knob from its spindle or shank.

Another material object of it is to enable the knobs and shank to be readily adaptable to doors of different thicknesses, as well as to adjust and support the knobs, so that there may be little or no lateral play or shake, as well as little or no endwise movement of them when in use.

In the drawing—

D denotes what may be termed the knob-body supports, which consist of a metallic disk, $a$, and a tubular projection, $b$, arranged concentrically, and having a male screw cut on the external surface of the said projection. This body-supporter is to be fastened to the door by means of screws $c\ c$ going through the disk and into the door.

On the said screw of the part $b$ the knob-body $d$ is to be screwed, such body being separate from the head $e$, and formed with a longitudinal section, as represented.

The body $d$, and the head $e$ I usually make of wood, the spindle being of metal. Any proper material or materials, however, may be used in making the said parts of the knob.

The body $d$ is tubular, to receive the shank or spindle E of the lock; and, furthermore, such body is chambered at its larger end to receive and encompass and fit closely to the disk $a$. The body $d$ is also chambered at its lesser or outer end, or has there a circular bearing, $f$, to receive a cylindrical journal, $g$, projecting from the head $e$.

This journal $g$ screws upon a sleeve, $h$, that is placed upon the shank or spindle E so as to revolve therewith, the spindle being square or prismatic where it enters the sleeve, and the latter being formed to fit to the spindle, in manner as represented.

A male screw, $i$, provided with a notched head, screws endwise into the spindle E, and goes through a retaining disk or washer, $k$, having a diameter larger than that of the adjacent end of the spindle.

There is a recess or chamber, $l$, formed in the head $e$, to receive the disk $k$ and the head of the screw.

One or more small, square, metallic extension-pieces $m$, each having a width equal to, or a little less than, that of the end of the spindle, which is also square, may be placed on the screw $i$, in order to enable the spindle to be adapted to a door so as to avoid endwise play of the spindle.

From the above it will be seen that the knob, in some particulars, is like a capstan, formed with a head, to revolve independently of the barrel or body. For this reason I have termed the knob the "capstan-knob," in order, in common parlance, to distinguish it from others.

By turning the head $e$, on the body $d$, the spindle will be revolved with the head, and the body will be stationary.

The head takes, or has, a bearing in the body, by which the head is supported, so that there can be no injurious or unpleasant lateral movement or shake of the head while being revolved.

I make no claim to the knob or mechanism as described in Almon Cooley's rejected application, filed October 13, 1860; nor do I claim any thing or combination as described in the British patent of Pitt, No. 1,350, for 1858. Neither of them show my peculiar construction of knob, nor do they show my peculiar arrangement or employment of one or more extension-pieces, with the screws and washer of the spindle and sleeve.

I claim—

The improved knob, as made with its head $e$ and body $d$ in two parts, as described, and with the head to extend into and encompass the body, and to screw upon a sleeve, $h$, applied and fastened to the spindle E, in manner and by means as set forth, the part or body $d$ of the knob being screwed to or fastened upon the rose or part D connected with the door, as explained; also The arrangement of one or more extension-pieces $m$, with the spindle E, the sleeve $h$ and its confining-screw $i$, and the knob-head $e$, and body $d$, constructed and applied together, substantially in manner as hereinbefore explained.

GEO. W. CADY.

Witnesses:
JOHN H. STINESS,
P. B. STINESS, Jr.